(12) United States Patent
Marr et al.

(10) Patent No.: US 10,536,302 B1
(45) Date of Patent: Jan. 14, 2020

(54) BEAMSPACE NONLINEAR EQUALIZATION FOR SPUR REDUCTION

(71) Applicant: RAYTHEON COMPANY, Waltham, MA (US)

(72) Inventors: Harry B. Marr, Manhattan Beach, CA (US); Zachary Dunn, Wylie, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/122,733

(22) Filed: Sep. 5, 2018

(51) Int. Cl.
| | |
|---|---|
| *H03D 1/04* | (2006.01) |
| *H03D 1/06* | (2006.01) |
| *H03K 5/01* | (2006.01) |
| *H03K 6/04* | (2006.01) |
| *H04B 1/10* | (2006.01) |
| *H04L 1/00* | (2006.01) |
| *H04L 25/08* | (2006.01) |
| *H04L 25/03* | (2006.01) |
| *H04L 25/02* | (2006.01) |

(52) U.S. Cl.
CPC .... *H04L 25/03057* (2013.01); *H04L 25/0212* (2013.01)

(58) Field of Classification Search
CPC ........... H04L 25/03057; H04L 25/0212; H04L 25/03885; H04L 25/03044; H04L 25/03127; H03M 1/121; A61B 8/5207
USPC ................................. 375/229–232, 350, 346
See application file for complete search history.

(56) References Cited

U.S. PATENT DOCUMENTS

| | | | |
|---|---|---|---|
| 6,653,959 B1 * | 11/2003 | Song | H03M 1/121 341/131 |
| 8,306,101 B2 | 11/2012 | Azizi | |
| 2003/0063663 A1 * | 4/2003 | Bryant | H04L 25/03885 375/229 |
| 2017/0052250 A1 * | 2/2017 | Jeong | A61B 8/5207 |

(Continued)

OTHER PUBLICATIONS

Jeon et al., "On the Achievable Rates of Decentralized Equalization in Massive MU-MIMO Systems," IEEE International Symposium on Information Theory, May 8, 2017, 5 pages.

(Continued)

*Primary Examiner* — Phuong Phu
(74) *Attorney, Agent, or Firm* — Lewis Roca Rothgerber Christie LLP

(57) ABSTRACT

System and method for beamspace nonlinear equalization in a plurality of parallel channels includes: receiving M parallel signals for transmission by N channels, respectively, wherein M is an integer greater than or equal to 1 and N is an integer greater than 1; performing a linear transfer function on each of the M parallel signal by a finite impulse response (FIR) filter; adding FIR filter tap outputs to each M parallel signals, respectively; phase shifting an output of a respective FIR filter per each of the M parallel signals to generate M intermediate channelized output signals per each of the N channels; summing, by a single summer, the M intermediate channelized output signals across the N channels to produce M channelized polyphase output signals; serializing the M channelized polyphase output signals to generate serialized M polyphase output signals; and equalizing the serialized M polyphase output signals to produce a linearized signal in beamspace.

17 Claims, 5 Drawing Sheets

(56) References Cited

U.S. PATENT DOCUMENTS

2017/0366375 A1* 12/2017 Pham ................ H04L 25/03044
2018/0254769 A1*  9/2018 Alic ................. H04L 25/03127

OTHER PUBLICATIONS

Wang et al., "Spectrum and Energy Efficient Beamspace MIMO-NOMA for Millimeter-Wave Communications Using Lens Antenna Array," IEEE Journal on Selected Areas in Communications, Jul. 21, 2017, 35.10, pp. 2370-2382.

* cited by examiner

BEAMSPACE NONLINEAR EQUALIZATION FOR SPUR REDUCTION

FIELD OF THE INVENTION

The present invention relates generally to signal processing and more specifically to distortion error correction in array processing.

BACKGROUND

Signal equalization is the reversal of distortion incurred by a signal transmitted through an imperfect channel. Equalization makes the frequency response of a channel flat (i.e., no distortion) across the bandwidth under consideration. In an equalization operation, the frequency domain attributes of the desired signal at the input of the channel are reproduced at the output of the channel. Equalization is widespread, for example, radars, telephones, DSL lines, and television cables use equalizers to prepare data signals for transmission.

An equalizer circuit generates an output signal by equalizing its input signal. A typical equalizer circuit includes at least two interconnected and mutually interfering equalizers that exhibit different center frequencies. The gains of the two mutually interfering equalizers at the respective center frequencies are controllable by external control signals. The input signal of the equalizer circuit is spectrally weighted based on the external control signals. In digital signal processing, an equalizer circuit reduces intermodulation interference to allow recovery of the transmitted signal, typically by a simple linear filter or a complex algorithm.

A linear equalizer applies the inverse of the channel frequency response to the received signal to restore the signal after it leaves the channel. Although linear equalizers are simple to construct, most practical equalizers are made based on non-linear equalizing techniques due to the effects introduced due to time varying signals. Linearity is typically a difficult requirement in radio frequency (RF) systems. Nonlinear equalization (NLEQ) algorithms have been shown to substantially reduce spurs, but only if the NLEQ is performed on every individual channel. This creates a substantial amount of I/O and real time processing that is preferred to be mitigated and moved to the backend processing.

FIG. 1 is a simplified block diagram of a transfer function for a conventional non-linear equalization. As shown, there are N parallel channels X[1] to X[N], each with unique non-linear characteristics in this example. One of a plurality of independent non-linear transfer functions, $F_1, \ldots F_N$, in each respective channel 1 to N to represent the unique non-linear frequency response of the respective channel. Additionally, one of a plurality of independent post-distortion filter $G_1^{-1}$, $G_N^{-1}$, is also placed in each channel to corresponding unique non-linear distortion so that the corrected signal with a flat frequency response results in that channel. The output of each post-distortion filter $G_1^{-1}$, $G_N^{-1}$ is added together by a summer $\Sigma$ to provide a distortion free output signal Y[n]. As discussed above, this conventional approach requires a substantial amount of I/O and real time processing since a post-distortion filter $G^{-1}$ is required for each channel.

SUMMARY

In some embodiments, the disclosed invention is a system for beamspace nonlinear equalization in a plurality of parallel channels. The system includes a demultiplexer to decimate a digital input signal into M parallel signals for transmission by N channels, respectively, wherein M is an integer greater than or equal to 1 and N is an integer greater than 1; a finite impulse response (FIR) filter per each of the N channels to perform a linear transfer function on each of the M decimated parallel signals; an adder per each of the N channels to add FIR filter tap outputs to each M decimated parallel signals, respectively; a phase shifter per each of the N channels to phase shift the output of a respective FIR filter in a respective the M decimated parallel signal to generate M intermediate channelized output signals per each of the N channels; a summer to sum the M intermediate output signals across the N channels to produce M channelized polyphase output signals; a serializer electrically coupled to the summer to serialize the M channelized polyphase output signals; and a nonlinear equalizer to equalize the serialized signals to produce a linearized signal in beamspace.

In some embodiments, the disclosed invention is a system for beamspace nonlinear equalization in a plurality of parallel channels. The system includes: an input port for receiving M parallel signals for transmission by N channels, respectively, wherein M is an integer greater than or equal to 1 and N is an integer greater than 1; a phase shifter per each of the N channels to phase shift the M parallel signal to generate M intermediate output signals per each of the N channels; a summer to sum the M intermediate output signals across the N channels to produce M channelized polyphase output signals; a serializer electrically coupled to the summer to serialize the M channelized polyphase output signals to generate serialized M polyphase output signals; equalizer to equalize the serialized M polyphase output signals to produce a linearized signal in beamspace.

In some embodiments, the system may further include an analog-to-digital converter (ADC) to digitize a baseband analog input signal to generate the digital input signal and a memory electrically coupled to each of the FIR filters for storing filter coefficients for each delay tap of the FIR filter.

In some embodiments, the disclosed invention is a method for beamspace nonlinear equalization in a plurality of parallel channels. The method includes receiving M parallel signals for transmission by N channels, respectively, wherein M is an integer greater than or equal to 1 and N is an integer greater than 1; performing a linear transfer function on each of the M parallel signal by a finite impulse response (FIR) filter; adding FIR filter tap outputs to each M parallel signals, respectively; phase shifting an output of a respective FIR filter in each of the M parallel signals to generate M intermediate output signals per each of the N channels; summing, by a single summer, the M intermediate channelized output signals across the N channels to produce M channelized polyphase output signals; serializing the M channelized polyphase output signals to generate serialized M polyphase output signals; and equalizing the serialized M polyphase output signals to produce a linearized signal in beamspace.

BRIEF DESCRIPTION OF THE DRAWINGS

These and other features, aspects, and advantages of the present invention will become better understood with regard to the following description, appended claims, and accompanying drawings.

DETAILED DESCRIPTION

In some embodiments, the disclosed invention is a system that performs nonlinear equalization (NLEQ), for example, intermodulation distortion from the third order products of a circuit (IMD3), in beamspace and therefore eliminates the need to perform NLEQ on every individual channel, which could easily amount to hundreds or thousands of channels in a standard array system and therefore substantially reducing the amount of I/O and real time processing needed in the system. The disclosed invention utilizes an architecture that takes advantage of channel averaging to perform NLEQ and compensate non-linearities across channels. The disclosed invention can also improve reducing third-order intercept point (IP3) versus NLEQ application at the individual channels. The spur reduction can include, but is not limited to, out-of-band spurious emissions on transmit, out-of-band response on receivers, mixers, analog-to-digital converters (ADCs), digital-to-analog converters (DACs) image management, phase-noise, phase coherence between elements, phase coherence between tiles, phase coherence between receive and transmit, phase repeatability or calibration upon startup, switching time between receive and transmit, and any potential calibration or built-in self-test schemes.

Figure 1:
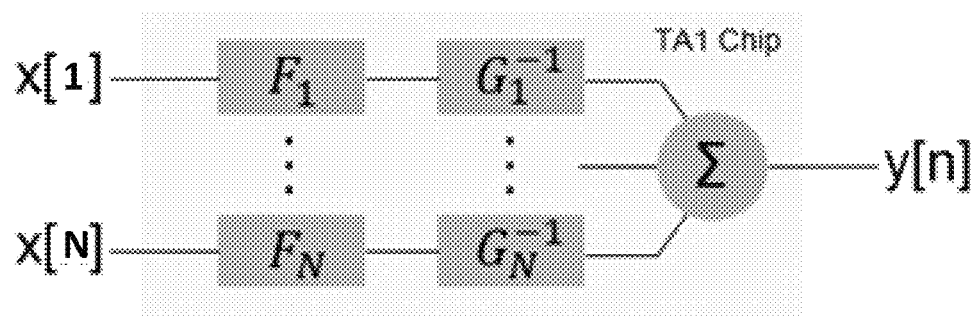
FIG. 1 is a simplified block diagram of a transfer function for a conventional nonlinear equalization (NLEQ).
Figure 2:
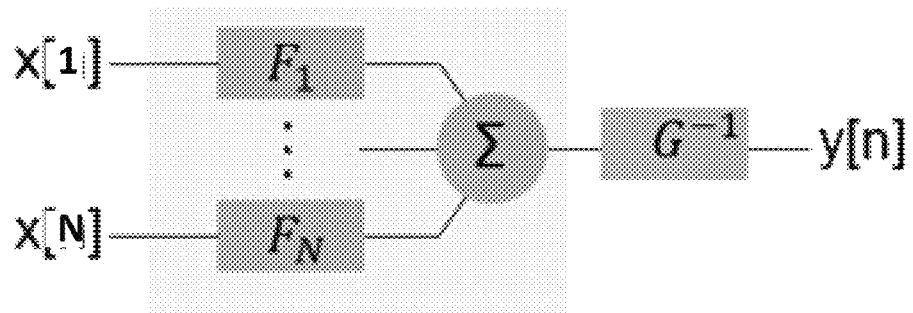
FIG. 2 is a simplified block diagram of a transfer function for NLEQ, according to some embodiments of the disclosed invention.

FIG. 2 is a simplified block diagram of an exemplary architecture for a NLEQ, according to some embodiments of the disclosed invention. As depicted, there are also N parallel channels X[1] to X[N], each with one independent non-linear transfer function, $F_1, \ldots F_N$, respectively, to represent the unique non-linear frequency response of the respective channels X[1] to X[N], such as randomized gain, phase, and non-linear effects on each channel (represented by the individual transfer functions $F_1, \ldots F_N$). It is assumed that the parallel channels in the array architecture are of identical construction and therefore have similar (though not identical) non-linear behavior per each channel, and that the input power range is limited so that the Power$_{out}$ vs Power$_{in}$ trend is monotonically increasing over the input power range.

The output of each non-linear transfer function $F_1$ to $F_N$, is added together by a summer E. Finally, the output of the summer Σ is filtered by a single post-distortion filter $G^{-1}$ to compensate for the system non-linearities on the final single beam formed by the summer Σ. The post-distortion filter output is a distortion free output signal Y[n]. In this approach, since only one post-distortion filter is used, the circuit complexity, processing resources, and power consumption are substantially reduced, especially for systems with hundreds or thousands of channels. In some embodiments, this approach reduces IMD3 spurs by as much as 24 dB in beamspace. In some embodiments, the NLEQ architecture of the present invention may be used in a dynamic digital beamforming network allowing a scalable number of beams and non-linear spur suppression. Some applications include but are not limited to advanced communication and radar system operation modes. Accordingly, the disclosed invention improves communication and radar technologies. One skilled in the art would recognize that the main novelty of the present invention is in the placement of the NLEQ post-inverse filter in the beamspace portion of an array architecture, rather than in the details of a specific NLEQ model for a given implementation.

Figure 3:
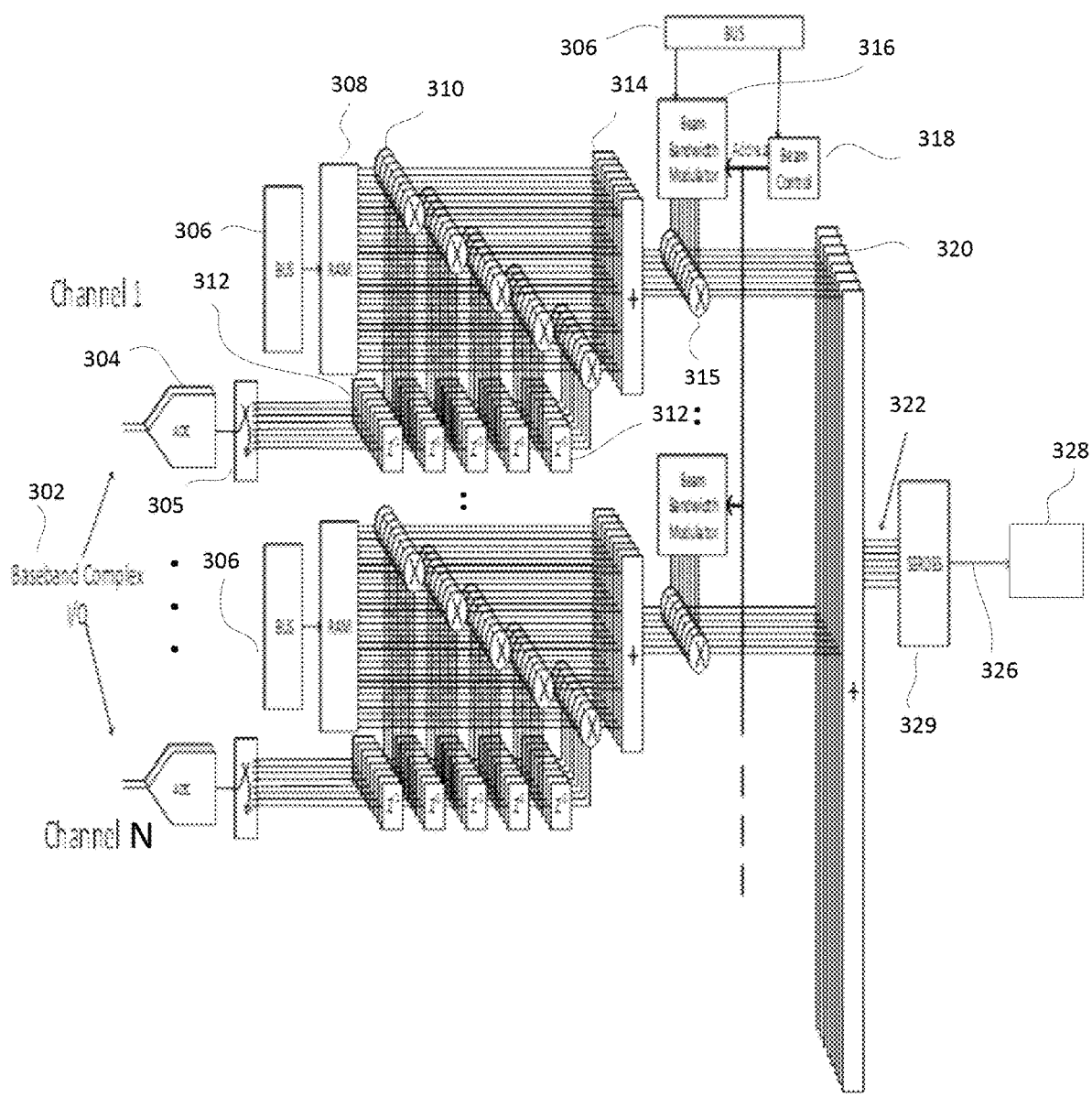
FIG. 3 is a circuit diagram for a NLEQ in beamspace, according to some embodiments of the disclosed invention.

FIG. 3 is a circuit diagram for a NLEQ in beamspace, according to some embodiments of the disclosed invention. These embodiments may include hardware for a two-step process. In the first step, linear equalization is performed in each channel to more closely match phase and ideal gain behavior between channels. Since linear equalization can utilize a much simpler circuit than that required for a NLEQ circuit, there is not a substantial burden on the processing resources or power consumption. The linear equalization of each channel is then followed by a summation prior to applying the beamspace NLEQ. As shown, there are N independent array channels, each being linearly equalized by a finite impulse response (FIR) filter of nth order. For purposes of simplicity, only one channel is described herein. One skilled in the art would recognize that the rest of the channels include similar hardware and function similarly.

A baseband analog signal (e.g., I or Q stream) 302 coming from, for example, a phased array antenna, is input to an analog-to-digital converter (ADC) 304 to be digitized. The digitized signals are then decimated into N parallel signals (for example 8 signals) by a demultiplexer 305, that acts as decimator from the input sampling rate to each of the parallel output lines, in order to alleviate processing requirements of a linear equalization filter. Each of the decimated signals (hereinafter, only one of the plurality of decimated signals is described for simplicity reasons) is then input to the FIR filter of nth order, having n delay taps 312 (a delay matrix) to perform a linear transfer function in time domain.

The filter coefficients 310 for each delay tap 312 are stored in a memory 308 electrically coupled to a processor (not shown) via a bus 306. The outputs of each delay tap 312 are multiplied by the specified filter coefficients 310, output from memory 308. One skilled in the art would recognize that the memories 308 for the N channels may be implemented in a single memory (e.g., a RAM that is coupled to each of the N channels). The resulting signals are then summed by an adder 314 and phase shifted by a complex phase shifter 315, yielding a filtered and phase shifted intermediate channelized output of the active input channel.

Due to the FIR filter containing only linear terms, a resulting linear transfer function is executed so that the phase interferes coherently when combined with other channels in a next-level summer 320. Array beamsteering is executed through the complex phase shifter 315, where the phase shift is accomplished through a multiplication of the FIR filter output sum with a coefficient specified by a beam bandwidth modulator 316, which in turn has its set of coefficients specified by the beam control 318 electrically coupled to the controller bus 306. In some embodiments, the beam bandwidth modulator's coefficients are determined by conventional array beamsteering techniques, executed by the beam control 318, taking into account the commanded steering direction and the antenna elements' required basic properties, such as frequency and location.

The outputs of each complex phase shifter 315 for each channel (1 to N) are then summed by the summer 320 to produce N polyphaser output signals 322 at the decimated sampling rate. For example, demultiplexer 305 splits the incoming channel into N sub-channels, each at 1/N of the ADC sampling rate. The N polyphaser output signals 322 are then serialized by a serializer 329 to form a serialized signal beam 326. In some embodiments, serializer 329 is also a de-serializer capable of de-serializing signals. A non-linear equalization process is then performed on this single serialized signal beam 326 by a beamspace NLEQ process represented by block 328. A more detailed description of some embodiments of nonlinear equalizer 328 is provided below with respect to FIG. 4.

Figure 4:
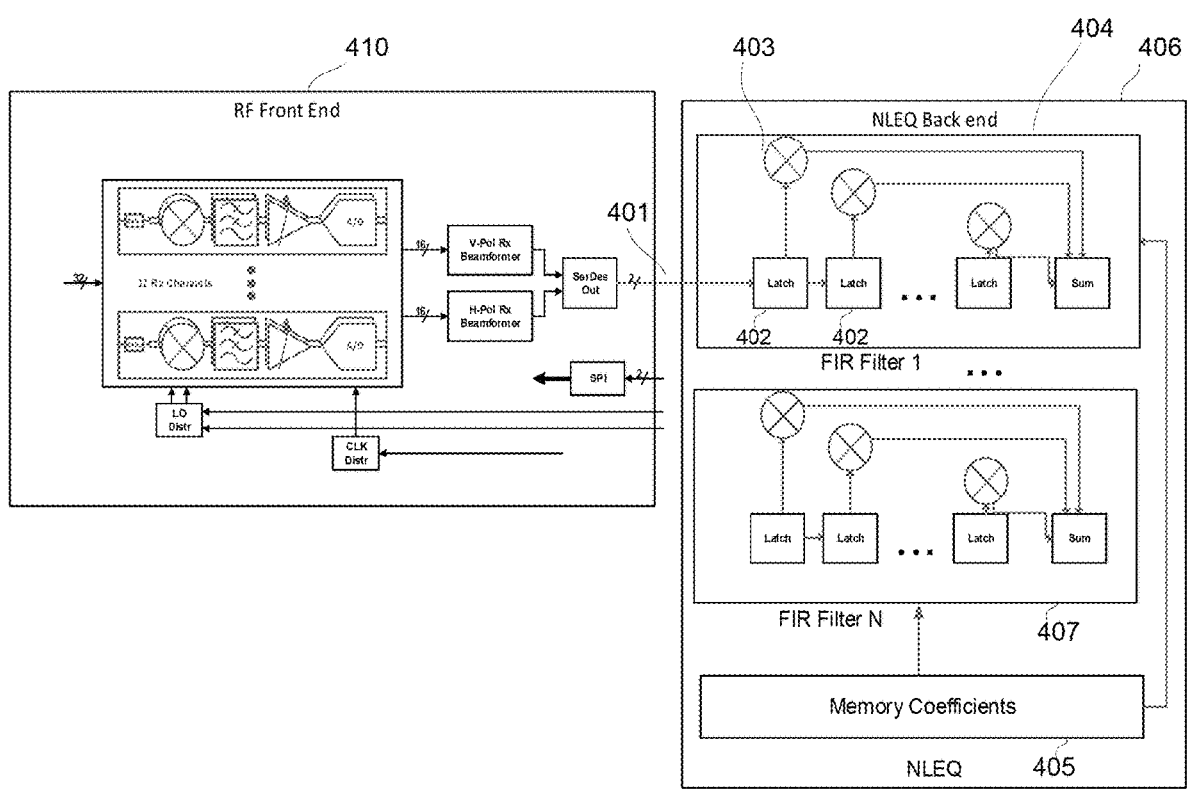
FIG. 4 shows an exemplary schematic diagram for a NLEQ process and a digital FIR filter bank, according to some embodiments of the disclosed invention.

FIG. 4 shows an exemplary schematic diagram for a NLEQ process and a digital FIR filter bank, according to some embodiments of the disclosed invention. As shown, a digital beam 401 formed by the known beamforming circuit 410 is streamed to a NLEQ circuit 406. The data is latched into a digital latch, such as a flip flop 402 and multiplied in a digital multiplier 403 by a coefficient, which is provided from a memory bank of the required NLEQ coefficients 405. The samples from NLEQ circuit 406 are delayed in time by a clock cycle and cascaded through a series of latches, where data in each latch is multiplied by a coefficient and then summed, as required by a conventional FIR filter 404.

Depending on the requirement of the NLEQ process (e.g., its dimensionality), a bank of additional FIR filters 407 may be included in NLEQ circuit. For example, for a dimensionality of 4, 4×FIR filters are needed. The dimensionality is determined by the Memory Polynomial model equations known in the art. The memory coefficients 405 are computed ahead of time using calibration data and equations as explained below with respect to FIG. 5. However, this computation of memory coefficients does not have to be performed in real time and may be performed offline using a computer. In some embodiments, NLEQ circuit 406 performs a vector multiplication, or a matrix multiply operation in higher dimensional cases, such that the calculation that NLEQ circuit 406 performs could be done in a matrix multiply operation such as in a processor or graphics processing unit (GPU). The bank of FIR filters 404 and 407 implement a vector times a matrix operation, or vector-matrix multiply. In some embodiments, the NLEQ circuit 406 in FIG. 4 also shown as 328 in FIG. 3 is implement by a field programmable gate array (FPGA) or an application specific integrated circuit (ASIC). In some embodiments, these operations performed by a GPU instead of an FPGA or ASIC.

In some embodiments, the NLEQ process is executed by a post-inverse filter (for example, $G^{-1}$ in FIG. 2, or block 328 in FIG. 3). The NLEQ post-inverse filter can be analog or digital. If digital, being in post-processing, the post-inverse filter can be causal or non-causal, adaptive or non-adaptive, standalone or utilizing system-level or channel-level feedback in order to store, generate, or update an arbitrary fixed or changing number of filter coefficients.

In some embodiments, the disclosed invention is a method for beamspace nonlinear equalization in a plurality of parallel channels. The method comprises the following process: receiving, by an input port, M parallel signals for transmission by N channels, respectively, wherein M is an integer greater than or equal to 1 and N is an integer greater than 1; performing a linear transfer function on each of the M parallel signal by a finite impulse response (FIR) filter (e.g., FIR filters 407 in FIG. 4); adding FIR filter tap outputs in each M parallel signals, respectively (e.g., by adder 314 of FIG. 3); and phase shifting an output of a respective FIR filter in each of the M parallel signals to generate M intermediate channelized output signals in each of the N channels (e.g., by phase shifter 315 of FIG. 3). The method further includes summing, by a single summer (e.g., by summer 320 of FIG. 3), the M intermediate channelized output signals across the N channels to produce M channelized polyphase output signals; serializing the M channelized polyphase output signals to generate serialized M polyphase output signals (e.g., by serializer 329 of FIG. 3); and equalizing the serialized M polyphase output signals to produce a linearized signal in beamspace (e.g., by linear equalizer 328 of FIG. 3).

Figure 5:
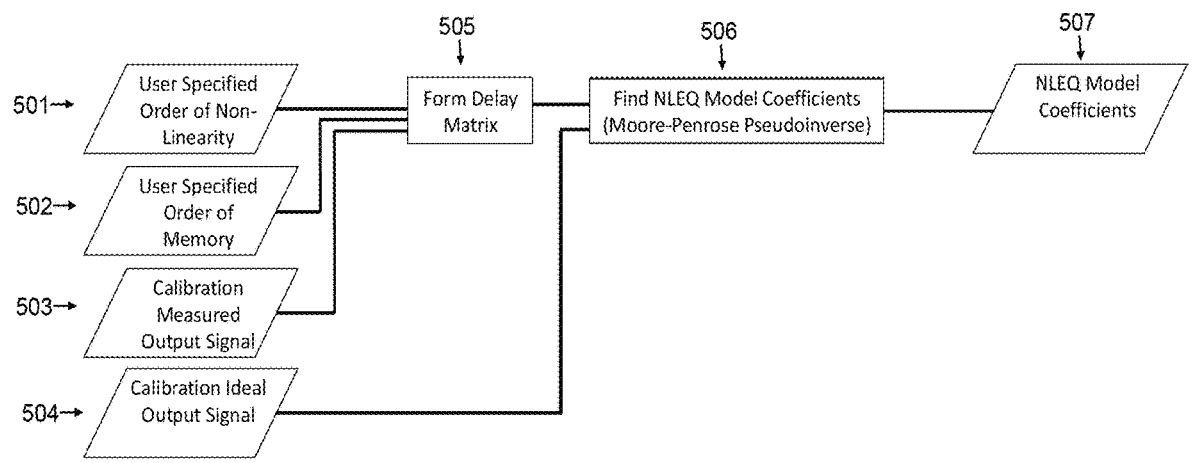
FIG. 5 is an exemplary process flow diagram for NLEQ calibration, according to some embodiments of the disclosed invention.

FIG. 5 is an exemplary process flow diagram for NLEQ calibration, according to some embodiments of the disclosed invention. As one example, the disclosed invention utilizes a causal, fixed length, non-adaptive, standalone NLEQ process, known in the art as Memory Polynomial model, using the hardware described in FIG. 3 and associated firmware and/or software executed by a processor. However, those skilled in the art would recognize that other known NLEQ processes may equally be utilized and therefore are within the scope of the disclosed invention. As shown, NLEQ calibration is completed using a known signal 404 (calibration ideal output signal) measured in beamspace (called the calibration measured output signal 403), thus capturing the non-linear behavior of the system.

In FIG. 5, all data flow from left to right. Signals' 503 and 504 are signals that are computed via a calibration process. Phased arrays and RF transceivers are generally calibrated by running a test signal through the system, such as a chirp, and then the phase offset or distortion on the signal from the ideal signal (as if no phase offset or distortion occurred) is measured. Phase shifts, amplitude shifts, multiplications, and time delays are applied to calibrate the measured signal to be as close to the ideal signal as possible. Calibration measured output signal 503 is the measured output signal that has been calibrated, while signal 504 is the ideal signal. These signals 503 and 504 can have a variety of characteristics, depending on what in the system needs to be calibrated. For example, in an RF receiver that is receiving a signal through a limiter, LNA, balun, mixer, filter, baseband has different non-linearities than an RF receiver chain that is direct digital with only a limiter, LNA and analog to digital converter (ADC) in the chain. The calibration technique described in FIG. 5 applies to all RF chains.

A delay matrix, for example delay matrix 312 in FIG. 3, is formed in block 505 from the calibration measured output signal 503, a user specified order of non-linearity 501 and a user specified order of memory 502. The delay matrix and number of taps in the delay matrix is dictated by the order of the filter that is required to linearize the signal, namely, to create a linear phase slope and flat amplitude response over frequency. The flat amplitude is typically defined to be within 1 dB flatness, but can vary depending on system requirements. In some embodiments, 8 delay taps per RF channel provide a reasonable amplitude and phase response since an 8 tap FIR filter is a sufficiently large filter to create a desirable filter response. The delay between the taps is dictated by the instantaneous bandwidth of the incoming signal. For example, for the 8-tap embodiments, the FIR filter handles a signal with up to 2 GHz instantaneous bandwidth. The delay spacing between taps is one divided by the frequency instantaneous bandwidth, or 500 picoseconds in the 8-tap embodiments.

In some embodiments, a Moore-Penrose pseudoinverse process is then executed in block 406 on the delay matrix and the calibration ideal output signal 504 to form the least squares approximation of the NLEQ model coefficients 507. These NLEQ model coefficients are the FIR filter coefficients that are loaded into the coefficient memory, for example, as depicted by block 405 in FIG. 4. As described with respect to FIG. 4, these NLEQ model (FIR filter) coefficients are multiplied with an incoming signal (e.g., 401 in FIG. 4) by a digital multiplier (e.g., 403 in FIG. 4). This pseudoinverse maybe performed off line in a calibration process, typically by streaming an RF signal through the complex baseband channels (e.g., 302 in FIG. 3), starting with the ADC 304 as inputs, using an FIR filter response normalized to 1, through the FIR filter (e.g., made up of 312, 308, 310, and 314, in FIG. 3) and then the I/O data is read out of each channel of the adder 314.

In some embodiments, a test port to collect data is inserted so that data can be collected directly from the ADC 304. Once this test data is collected, a Moore-Penrose Pseudoinverse or other methods to find the coefficients are performed on a computer, based on the data collected out of the ADC 304. Once these coefficients are computed, for example, by a computer, they are loaded into the memory coefficients of the NLEQ circuit (e.g., 405 in FIG. 4). As known in the art, the Moore-Penrose pseudoinverse process is used to compute a best fit (least squares) solution to a system of linear equations that lacks a unique solution and/or to find the minimum (Euclidean) norm solution to a system of linear equations with multiple solutions.

Figure 6:
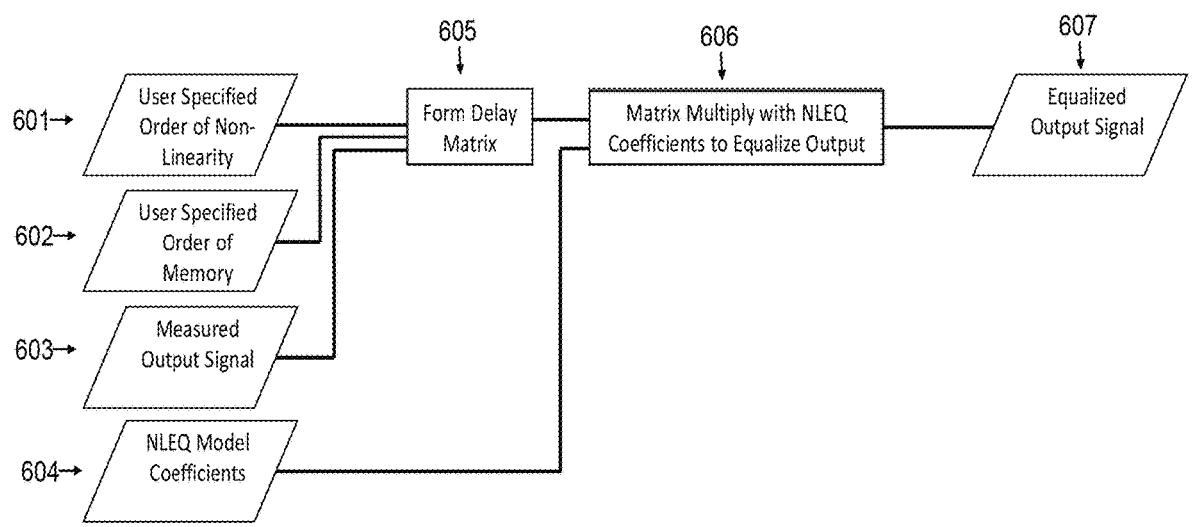
FIG. 6 is an exemplary process flow diagram for NLEQ, according to some embodiments of the disclosed invention.

FIG. 6 is an exemplary process flow diagram for NLEQ, according to some embodiments of the disclosed invention. Once a NLEQ calibration is performed, for example, according to the process described in FIG. 5, a delay matrix is formed in block 605 with a measured output signal 603 in conjunction with the user specified order of non-linearity 601 and user specified order of memory 602. As known in the art, if a higher linearity of the signal, that is, a further reduction of the intermodulation distortion third order products (IM3s) is desirable, more filter coefficients (e.g., NLEQ coefficient, 405, in FIG. 4) are required. In general, the system user can trade off the size of memory for amount of linearity.

In some embodiments, up to 30 dB of improvement is achieved, however, a larger size of the memory bank size on the order of several 100 Megabits is required. The exact amount of memory needed for a given linearity improvement is specifically dependent on the particular hardware in the RF chain such as the ADC 304 in FIG. 3 and any other RF or mixed signal components in the RF chain. The amount of memory is also dependent on the power level of the input signal into the RF chain used on the calibration signals 503 and 504, in FIG. 5. If any component in the receive RF chain 408 is saturated, many more memory coefficients and a larger FIR filter in the NLEQ circuit 406 are needed, to achieve a given linearity improvement.

Referring back to FIG. 6, the delay matrix in block 605 is multiplied with the NLEQ model coefficients 604 in block 606 to form the equalized output signal 607. The computed NLEQ coefficients are loaded into the memory 405 of the NLEQ circuit 406.

Placement of the NLEQ post-inverse filter in the beamspace portion of an array architecture, according to the disclosed invention, takes advantage of variances in the non-linear behavior of the individual channels to reduce spurs and intermodulation distortion. For example, when channels 1 through N are combined into a beam in the adder 320 of FIG. 3, the variances between the different channels, such as channel 1 through channel N are averaged together. Accordingly, once the signals from the channels are combined, for example, in the adder 320 and sent to the NLEQ circuit 328 over the output line 326, some of the non-linearities have been averaged out relative to a single channel and therefore the signal inputted to the NLEQ circuit is more linear and gains better linearity improvements after NLEQ circuit, even relative to the traditional NLEQ implementation method on each individual channel. Beamspace implementation also significantly reduces the circuit complexity, processing resources, and power consumption versus the traditional implementation.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. A system for beamspace nonlinear equalization in a plurality of parallel channels comprising:
   a demultiplexer to decimate a digital input signal into M parallel signals for transmission by N channels, respectively, wherein M is an integer greater than or equal to 1 and N is an integer greater than 1;
   a finite impulse response (FIR) filter per each of the N channels to perform a linear transfer function on each of the M parallel signals;
   an adder per each of the N channels to add FIR filter tap outputs to each M parallel signals, respectively;
   a phase shifter per each of the N channels to phase shift the output of a respective FIR filter for a respective M parallel signal to generate M intermediate output signals per each of the N channels;
   a summer to sum the M intermediate output signals across the N channels to produce M channelized polyphase output signals;
   a serializer electrically coupled to the summer to serialize the M channelized polyphase output signals to generate serialized M polyphase output signals; and
   a nonlinear equalizer to equalize the serialized M polyphase output signals to produce a linearized signal in beamspace.

2. The system of claim 1, further comprising an analog-to-digital converter (ADC) to digitize a baseband analog input signal to generate the digital input signal.

3. The system of claim 1, further comprising a memory electrically coupled to each of the FIR filters for storing filter coefficients for each delay tap of the FIR filters.

4. The system of claim 1, further comprising a beam bandwidth modulator per each of the N channels to specify a coefficient for each of the phase shifters in the M decimated parallel signals per channel.

5. The system of claim 4, wherein each of the phase shifters performs phase shifting in a respective channel by multiplying the output of the respective FIR filter in the respective channel with a coefficient specified by a respective beam bandwidth modulator filter in the respective channel to perform array beamsteering.

6. The system of claim 1, wherein the nonlinear equalizer linearizes the serialized M polyphase output signal by an inverse filter that characterizes an inverse of undesired non-linear behavior of one or more of the demultiplexer, FIR filter, adder, phase shifter and serializer.

7. A method for beamspace nonlinear equalization in a plurality of parallel channels, the method comprising:

receiving M parallel signals for transmission by N channels, respectively, wherein M is an integer greater than or equal to 1 and N is an integer greater than 1;

performing a linear transfer function on each of the M parallel signal by a finite impulse response (FIR) filter;

adding FIR filter tap outputs to each M parallel signals, respectively;

phase shifting an output of a respective FIR filter in each of the M parallel signals to generate M intermediate output signals per each of the N channels;

summing, by a single summer, the M intermediate channelized output signals across the N channels to produce M channelized polyphase output signals;

serializing the M channelized polyphase output signals to generate serialized M polyphase output signals; and equalizing the serialized M polyphase output signals to produce a linearized signal in beamspace.

8. The method of claim 7, further comprising digitizing and decimating a baseband analog input signal to generate the M parallel signals.

9. The method of claim 7, further comprising storing filter coefficients for each delay tap of the FIR filters in a memory.

10. The method of claim 8, further comprising a beam bandwidth modulator per each of the N channels to specify coefficients for the phase shifting in the M parallel signals.

11. The method of claim 10, wherein the phase shifting is performed in a respective channel by multiplying the output of the respective FIR filter in the respective channel with a coefficient specified by a respective beam bandwidth modulator filter in the respective channel to perform array beamsteering.

12. The method of claim 7, wherein the equalizing the serialized M polyphase output signals further comprises linearizing the serialized M polyphase output signals by an inverse filter that characterizes an inverse of undesired non-linear behavior of the method.

13. A system for beamspace nonlinear equalization in a plurality of parallel channels comprising:
   an input port for receiving M parallel signals for transmission by N channels, respectively, wherein M is an integer greater than or equal to 1 and N is an integer greater than 1;
   a phase shifter per each of the N channels to phase shift the M parallel signal to generate M intermediate output signals per each of the N channels;
   a summer to sum the M intermediate output signals across the N channels to produce M channelized polyphase output signals;
   a serializer electrically coupled to the summer to serialize the M channelized polyphase output signals to generate serialized M polyphase output signals; and
   a nonlinear equalizer to equalize the serialized M polyphase output signals to produce a linearized signal in beamspace.

14. The system of claim 13, further comprising a finite impulse response (FIR) filter per each of the N channels to perform a linear transfer function on each of the M parallel signals; and an adder per each of the N channels to add FIR filter tap outputs to each M parallel signals, respectively.

15. The system of claim 14, further comprising a memory electrically coupled to each of the FIR filters for storing filter coefficients for each delay tap of the FIR filters.

16. The system of claim 13, further comprising a beam bandwidth modulator per each of the N channels to specify a coefficient for each of the phase shifters in the M decimated parallel signals per channel.

17. The system of claim 16, wherein each of the phase shifters performs phase shifting in a respective channel by multiplying the output of the respective FIR filter in the respective channel with a coefficient specified by a respective beam bandwidth modulator filter in the respective channel to perform array beamsteering.

* * * * *